(12) United States Patent
Korich et al.

(10) Patent No.: US 7,597,560 B2
(45) Date of Patent: Oct. 6, 2009

(54) INTERFACE ASSEMBLIES FOR USE WITH INVERTERS OF VEHICLES

(75) Inventors: Mark D. Korich, Chino Hills, CA (US); Young Doo, La Palma, CA (US); David Tang, Fontana, CA (US); Mark L. Selogie, Manhattan Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/171,846

(22) Filed: Jul. 11, 2008

(65) Prior Publication Data

US 2009/0023306 A1    Jan. 22, 2009

Related U.S. Application Data

(60) Provisional application No. 60/950,298, filed on Jul. 17, 2007.

(51) Int. Cl.
*H01R 12/00* (2006.01)

(52) U.S. Cl. ........................................ 439/34; 439/76.2

(58) Field of Classification Search .................... 439/34, 439/76.1, 76.2, 212, 213, 571, 949
See application file for complete search history.

(56) References Cited

U.S. PATENT DOCUMENTS

| | | | | | |
|---|---|---|---|---|---|
| 4,906,195 | A | * | 3/1990 | Kubota et al. | ............... 439/76.2 |
| 4,940,419 | A | * | 7/1990 | Kurita et al. | ................. 439/271 |
| 4,995,818 | A | * | 2/1991 | Saimoto | ...................... 439/74 |
| 5,011,417 | A | * | 4/1991 | Matsumoto et al. | ........ 439/76.2 |

* cited by examiner

*Primary Examiner*—Khiem Nguyen
(74) *Attorney, Agent, or Firm*—Ingrassia Fisher & Lorenz, P.C.

(57) ABSTRACT

An interface assembly for an inverter of a vehicle includes an interface, a plurality of busbars, a communication medium, and a clip. The interface is for communicating with one or more vehicle systems outside of the interface assembly. The plurality of busbars are configured to receive and transport electric current. The communication medium is electrically coupled between the plurality of busbars and the interface. The communication medium is configured to provide information to the interface based at least in part on the electric current transported by the plurality of busbars. The clip assembly is electrically coupled between the plurality of busbars and the communication medium.

20 Claims, 6 Drawing Sheets

INTERFACE ASSEMBLIES FOR USE WITH INVERTERS OF VEHICLES

CROSS-REFERENCES TO RELATED APPLICATIONS

This application claims the benefit of U.S. Provisional Application No. 60/950,298, filed Jul. 17, 2007 (the entire content of which is incorporated herein by reference).

TECHNICAL FIELD

The subject matter described herein generally relates to vehicles, and more particularly relates to assemblies for use with inverters of vehicles in interfacing with other systems of the vehicles.

BACKGROUND OF THE INVENTION

Hybrid electric, fully electric, fuel cell, and other fuel efficient vehicles are becoming increasingly popular. Electric and hybrid electric vehicles utilize high voltage battery packs or fuel cells that deliver direct current necessary to drive vehicle motors, electric traction systems and other vehicle systems. These vehicles use thick electric current connectors to deliver high power direct current from battery packs, fuel cells, or other power sources to electric motors and other electric devices and systems of the vehicle.

In addition, these vehicles typically include inverters to convert the direct current provided by such battery packs, fuel cells, or other power sources to alternating current for use by such electric motors and other electric devices and systems of the vehicle. Such inverters generally require an interface to communicate with other systems in the vehicle, for example to request the delivery of additional electric current to the inverter as appropriate. Such interfaces are generally coupled to one or more direct current connectors via a circuit board or other communication medium associated with the inverter. However, it may be difficult to provide optimal coupling between the direct current connectors, the communication medium, and the interface. Without optimal coupling, slippage may result with the connectors, the communication medium, or the interface, or electrical coupling between the connectors, the communication medium, or the interface could be interrupted or otherwise compromised.

Accordingly, it is desirable to provide improved interface assemblies, for example that provide improved coupling between direct current connectors, communication medium, and interfaces of such interface assemblies. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, an interface assembly for an inverter of a vehicle is provided. The interface assembly comprises an interface, a plurality of busbars, a communication medium, and a clip. The interface is for communicating with one or more vehicle systems outside of the interface assembly. The plurality of busbars are configured to receive and transport electric current. The communication medium is electrically coupled between the plurality of busbars and the interface. The communication medium is configured to provide information to the interface based at least in part on the electric current transported by the plurality of busbars. The clip assembly is electrically coupled between the plurality of busbars and the communication medium.

In accordance with another exemplary embodiment of the present invention, another interface assembly for an inverter of a vehicle is provided. The interface assembly comprises a housing, an interface, a plurality of busbars, a communication medium, and a plurality of clips. The interface is for communicating with one or more vehicle systems outside of the interface assembly, and is housed at least partially within the housing. The plurality of busbars are also housed at least partially within the housing, and are configured to receive and transport electric current. The communication medium is also housed at least partially within the housing, and is electrically coupled between the plurality of busbars and the interface. The communication medium is configured to provide information to the interface based at least in part on the electric current transported by the plurality of busbars. The plurality of clips are also housed at least partially within the housing. Each of the plurality of clips is electrically coupled between a respective one of the plurality of busbars and the communication medium.

In accordance with a further exemplary embodiment of the present invention, yet another interface assembly for an inverter of a vehicle is provided. The interface assembly comprises a housing, an interface, a plurality of busbars, a circuit board, and a plurality of clips. The housing has a wall having a first side and a second side. The interface is for communicating with one or more vehicle systems outside of the interface assembly. The interface is disposed adjacent to the first side of the wall. The plurality of busbars extend through the wall, and are configured to receive and transport electric current. The circuit board is disposed adjacent to the second side of the wall. The circuit board is electrically coupled between the plurality of busbars and the interface, and is configured to provide information to the interface based at least in part on the electric current transported by the plurality of busbars. The plurality of clips are housed at least partially within the housing. Each of the plurality of clips is spring loaded against a respective one of the plurality of busbars. The plurality of clips are electrically coupled between the plurality of busbars and the circuit board.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
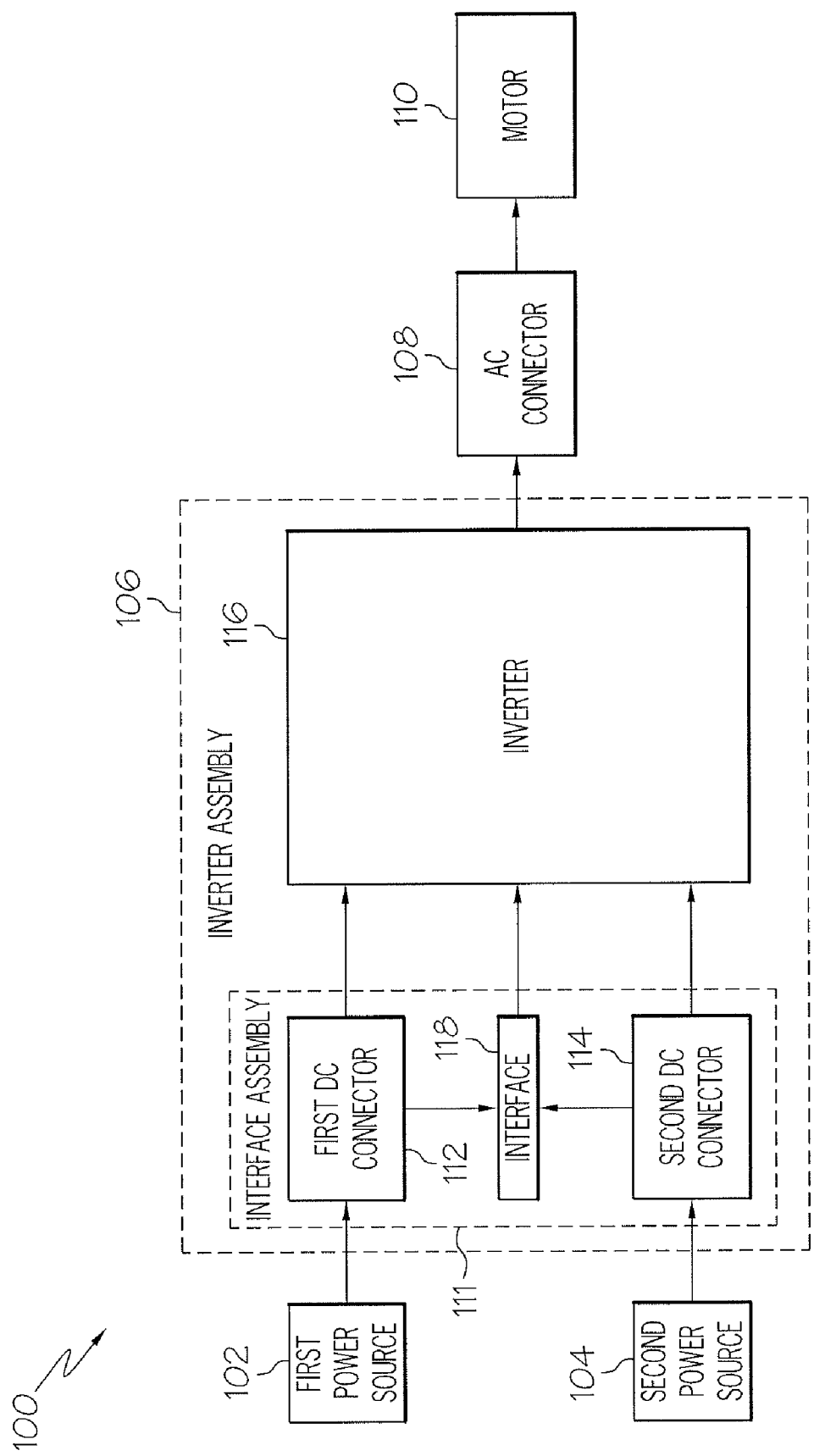
FIG. 1 is a functional block diagram of a motor system of a vehicle that includes a first power source, a second power source, an inverter assembly, an alternating current connector, and a motor, in accordance with an exemplary embodiment of the present invention.

FIG. 1 is a functional block diagram of a motor system 100 of a vehicle, in accordance with an exemplary embodiment of the present invention. The vehicle may be any one of a number of different types of automobiles, such, as, for example, a sedan, a wagon, a truck, a van, a sport utility vehicle (SUV), or any one of a number of other different types of automobiles or other vehicles. The vehicle may also include any one or more different types of engines, such as, for example, a gasoline or diesel fueled combustion engine, a flex fuel vehicle (FFV) engine that uses a mixture of gasoline and alcohol, a gaseous compound engine that uses a gaseous compound such as hydrogen and natural gas, a combustion/electric motor hybrid engine, an electric motor, or a fuel cell motor.

As depicted in FIG. 1, the motor system 100 includes a first power source 102, a second power source 104, an inverter assembly 106, an alternating current (AC) connector 108, and a motor 110. The first and second power sources 102, 104 may include batteries, fuel cells, and/or any number of other different types of power sources. The motor 110 may be any number of different types of motors of the vehicle. It will be appreciated that the number of power sources, inverter assemblies, AC connectors, and motors may vary from the depicted embodiment.

In the depicted embodiment, the first and second power sources 102, 104 provide direct current to the inverter assembly 106. The inverter assembly 106 receives the direct current from the first and second power sources 102, 104, converts the direct current to alternating current, and provides the alternating current to the AC connector 108. The AC connector 108 transports the alternating current to the motor 110.

In the depicted embodiment, the inverter assembly 106 includes an interface assembly 111 and an inverter 116. The interface assembly 111 is coupled between the first and second power sources 102, 104 and the inverter 116. The interface assembly 111 provides direct power from the first and second power sources 102, 104 to the inverter 116 and controls the inverter 116. The interface assembly 111 includes a first direct current (DC) connector 112, a second DC connector 114, and an interface 118.

The first DC connector 112 is coupled between the first power source 102, the inverter 116, and the interface 118. Specifically, the first DC connector 112 receives direct current from the first power source 102, and transports this direct current to the inverter 116. In addition, information regarding a first measure of the direct current of the first DC connector 112 is provided from the first DC connector 112 to the interface 118 via a communication medium (not depicted in FIG. 1, but described further below in connection with the communication medium 220 of FIGS. 2 and 3 and the circuit board 303 implementation of the communication medium 220 of FIG. 3) that is coupled thereto.

The second DC connector 114 is similarly coupled between the second power source 104, the inverter 116, and the interface 118. Specifically, the second DC connector 114 receives direct current from the second power source 104 and transports this direct current to the inverter 116. In addition, information regarding a second measure of the direct current of the second DC connector 114 is provided from the second DC connector 114 to the interface 118 via the communication medium (not depicted in FIG. 1, but described further below in connection with the communication medium 220 of FIGS. 2 and 3 and the circuit board 303 implementation of the communication medium 220 of FIG. 3) that is coupled thereto.

The inverter 116 converts the direct current that it receives from the first and second DC connectors 112, 114 to alternating current. The inverter 116 transports this alternating current to the AC connector 108. The AC connector 108, in turn, transports this alternating current to the motor 110 for use by the motor 110.

The inverter 116 is controlled by the interface 118 based at least in part on the first measure of direct current of the first DC connector 112 and the second measure of direct current of the second DC connector 114. For example, the interface 118 communicates with other vehicle systems, and requests that appropriate levels of additional electric current be supplied to the inverter 116 as needed based upon information regarding the first measure of direct current of the first DC connector 112 and the second measure of direct current of the second DC connector 114.

Figure 2:
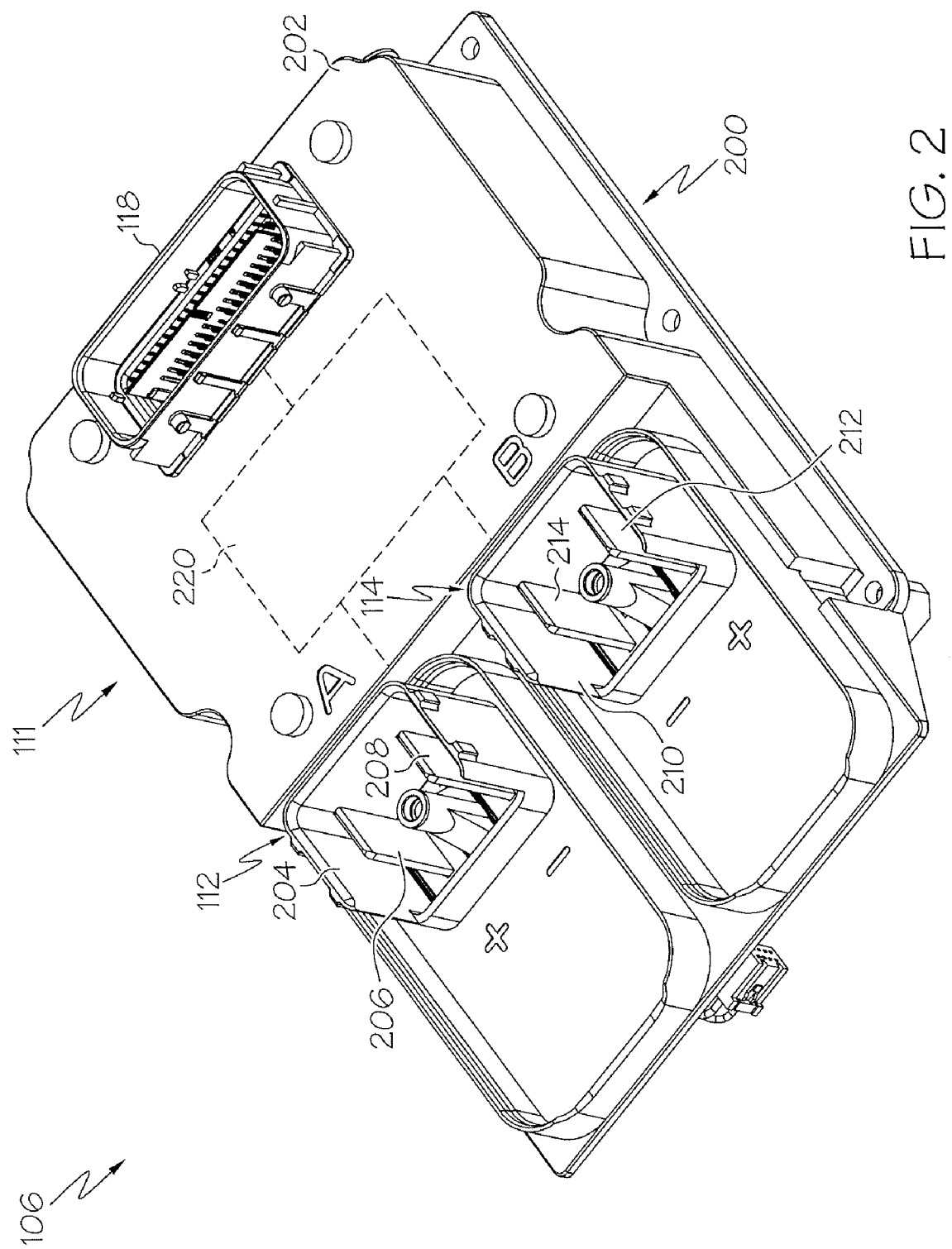
FIG. 2 is a perspective view of a portion of the inverter assembly of FIG. 1, including an interface assembly thereof, in accordance with an exemplary embodiment of the present invention.
Figure 4:
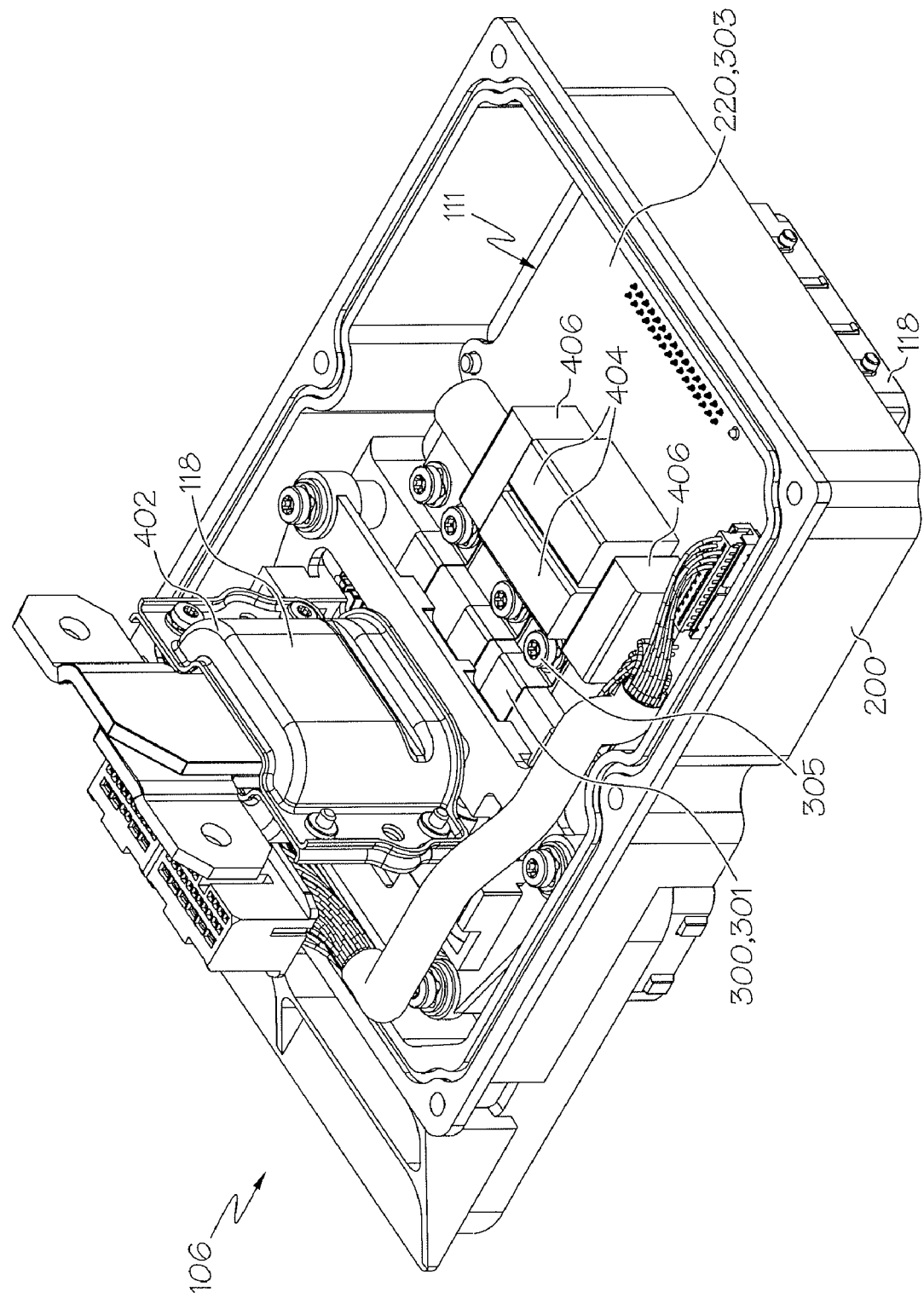
FIG. 4 is a perspective view of an underside of a portion of the inverter assembly of FIG. 1, including the interface assembly of FIGS. 2 and 3, in accordance with an exemplary embodiment of the present invention.

In a preferred embodiment, the components of the interface assembly 111 (including the first DC connector 112, the second DC connector 114, and the interface 118) are all housed within a common housing, such as the housing 200 that is depicted in FIGS. 2 and 4 and described below in connection therewith. Also in a preferred embodiment, the inverter 116 is housed within the same housing as the interface assembly 111, such as the above-referenced housing 200 of FIGS. 2 and 4.

It will be appreciated that the number of DC connectors, inverters, and interfaces may vary in other embodiments. It will similarly be appreciated that in certain embodiments the interface assembly 111 or certain components thereof, such as a DC connector and/or interface thereof, can be considered to be separate from the inverter assembly 106 and instead coupled to the inverter assembly 106, for example depending on how one defines the inverter assembly 106.

FIG. 2 is a perspective view of a portion of the inverter assembly 106 of FIG. 1, including the interface assembly 111 thereof, in accordance with an exemplary embodiment of the present invention. Specifically, FIG. 2 depicts the above-referenced housing 200 of the interface assembly 111 of FIG. 1, along with the first DC connector 112, the second DC connector 114, and the interface 118 of FIG. 1. FIG. 2 also depicts a communication medium 220 in phantom. The communication medium 220 is also preferably a part of the interface assembly 111 and the inverter assembly 106 of FIG. 1.

As depicted in FIG. 2, the housing 200 preferably includes at least a first wall 203 with a first side 201 and a second side 202. For example, in accordance with a preferred embodiment, the first wall 203 is referred to as a top wall of the housing 200, the first side 201 is referred to as a top side of the top wall of the housing 200, and the second side 202 is referred to as an underside of the top wall 203 of the housing 200. However, this may vary in other embodiments.

Also as depicted in FIG. 2, the first DC connector 112 includes a first DC connector shell 204, a first battery positive busbar 206, and a first battery negative busbar 208. Similarly, also as depicted in FIG. 2, the second DC connector 114 includes a second DC connector shell 210, a second battery positive busbar 212, and a second battery negative busbar 214.

The first DC connector shell 204 and the second DC connector shell 210 are preferably disposed at least approximately adjacent to one another, for example as shown in FIG. 2. Also as shown in FIG. 2, the first DC connector shell 204 and the second DC connector shell 210 preferably are each disposed at least partially within the housing 200. In addition, each of the first DC connector shell 204 and the second DC connector shell 210 preferably are each formed together with the housing 200 as one integral piece. However, this may vary in other embodiments.

Each of the first battery positive busbar 206, the first battery negative busbar 208, the second battery positive busbar 212, and the second battery negative busbar 214 has an electrically conductive body, and each is configured to receive and transport high power direct electric current. In a preferred embodiment, the first battery positive busbar 206, the first battery negative busbar 208, the second battery positive busbar 212, and the second battery negative busbar 214 extend at least partially through the housing 200. In a most preferred embodiment, the first battery positive busbar 206, the first battery negative busbar 208, the second battery positive busbar 212, and the second battery negative busbar 214 extend through the first wall 203 (i.e. the top wall of the housing, in accordance with an exemplary embodiment).

In certain non-limiting embodiments, each of the first battery positive busbar 206, the first battery negative busbar 208, the second battery positive busbar 212, and the second battery negative busbar 214 can handle currents up to 200 amps. However, this may vary in other embodiments. Also in a preferred embodiment, each of the first battery positive busbar 206, the first battery negative busbar 208, the second battery positive busbar 212, and the second battery negative busbar 214 is made of copper or a copper alloy. However, this also may vary in other embodiments.

As depicted in FIG. 2, the interface 118 is also preferably disposed at least partially within the housing 202. Also as depicted in FIG. 2, in a most preferred embodiment, the interface 118 is disposed adjacent to the first side 201 of the first wall 203 of the housing 200 (i.e., the top side of the top wall of the housing 200, in accordance with an exemplary embodiment). The interface 118 preferably comprises a signal interface that receives signals from the communication medium 220 that include the above-referenced information regarding the first measure of current of the first DC connector 112 and the second measure of current of the second DC connector 114 and controls the operation of the inverter 116 based thereon. In a preferred embodiment, the interface 118 communicates with and sends signals to various other vehicle systems in order to control the direct electric current provided to the inverter assembly 106 based at least in part on the information regarding the first measure of current of the first DC connector 112 and the second measure of current of the second DC connector 114.

Also as depicted in FIG. 2, the interface 118 is preferably electrically connected to both of the first and second DC connectors 112, 114 via the communication medium 220. Preferably, the communication medium 220 is housed at least partially within the housing 200. In a most preferred embodiment, the communication medium 220 is adjacent to the second side 202 of the first wall 203 of the housing 200 (i.e., the underside of the top wall of the housing 200, in accordance with an exemplary embodiment).

In a preferred embodiment, the communication medium 220 is a circuit board, such as the circuit board 303 depicted in FIG. 3 and described further below in connection therewith. In a preferred embodiment, the communication medium 220 is electrically coupled to the first and second DC connectors 112, 114 by a set of spring loaded clips, such as the clips 300 depicted in FIG. 3 and described further below in connection therewith.

The communication medium 220 is preferably electrically coupled to the interface 118 via various electric circuits of such a circuit board that comprises the communication medium 220. Specifically, in a preferred embodiment, the communication medium 220 receives first and second measures of current of the first and second DC connectors 112, 114, respectively, and provides signals bearing information based at least in part on these first and second measures of electric current to the interface 118. Also in a preferred embodiment, the interface 118 uses this information in controlling the inverter 116 and the inverter assembly 106.

As mentioned above, the entire inverter assembly 106 preferably shares the same housing 200 in a preferred embodiment of the present invention. Certain other components of the inverter assembly 106 are not depicted in FIG. 2, but are depicted in FIGS. 3 and 4, in which the inverter assembly 106 is depicted with other portions of the housing 200 removed for illustrative purposes, and are described further below in connection therewith.

Figure 3:
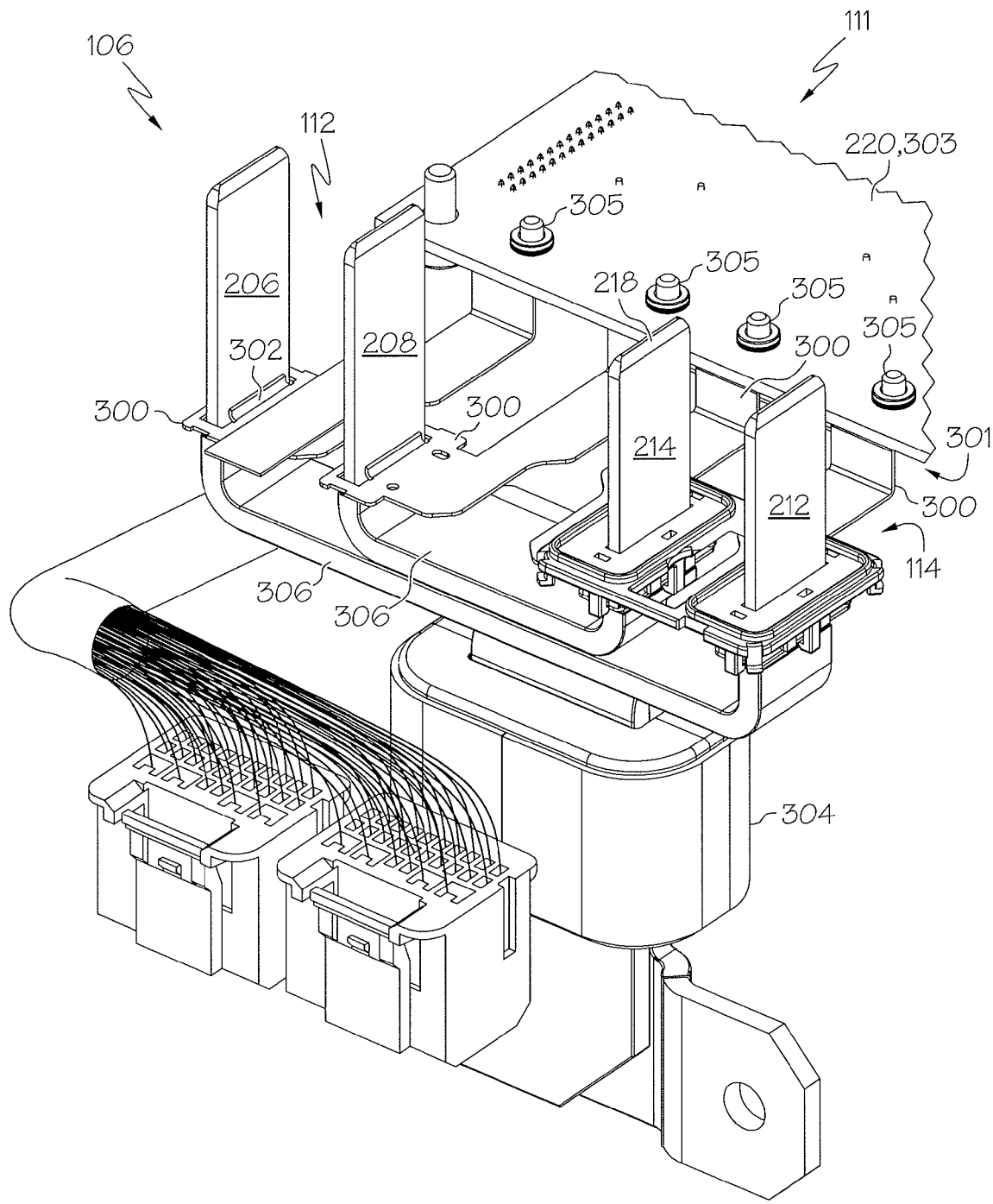
FIG. 3 is a perspective view of a portion of the inverter assembly of FIG. 1, including the interface assembly of FIG. 2, in accordance with an exemplary embodiment of the present invention.

FIG. 3 is a perspective view of a portion of the inverter assembly 106 of FIG. 1, including a portion of the interface assembly 111 of FIGS. 1 and 2 shown with the housing 200 removed, in accordance with an exemplary embodiment of the present invention. In FIG. 3, the portions of the inverter assembly 106 and the interface assembly 111 are depicted without the housing 200 for ease of illustration of various components within the housing 200.

As shown in FIG. 3, the clips 300 couple the first and second DC connectors 112, 114 with the communication medium 220, which is represented in FIG. 3 as the above-referenced circuit board 303 in accordance with a preferred embodiment. Specifically, the clips 300 comprise a clip assembly 301 as denoted in FIG. 3.

Each of the clips 300 couples a respective one of the first battery positive busbar 206, the first battery negative busbar 208, the second battery positive busbar 212 and/or the second battery negative busbar 214 to the circuit board 303 or other communication medium 220. In a preferred embodiment, each of the clips 300 is spring loaded against the respective one of the first battery positive busbar 206, the first battery negative busbar 208, the second battery positive busbar 212, or the second battery negative busbar 214.

Figure 5:
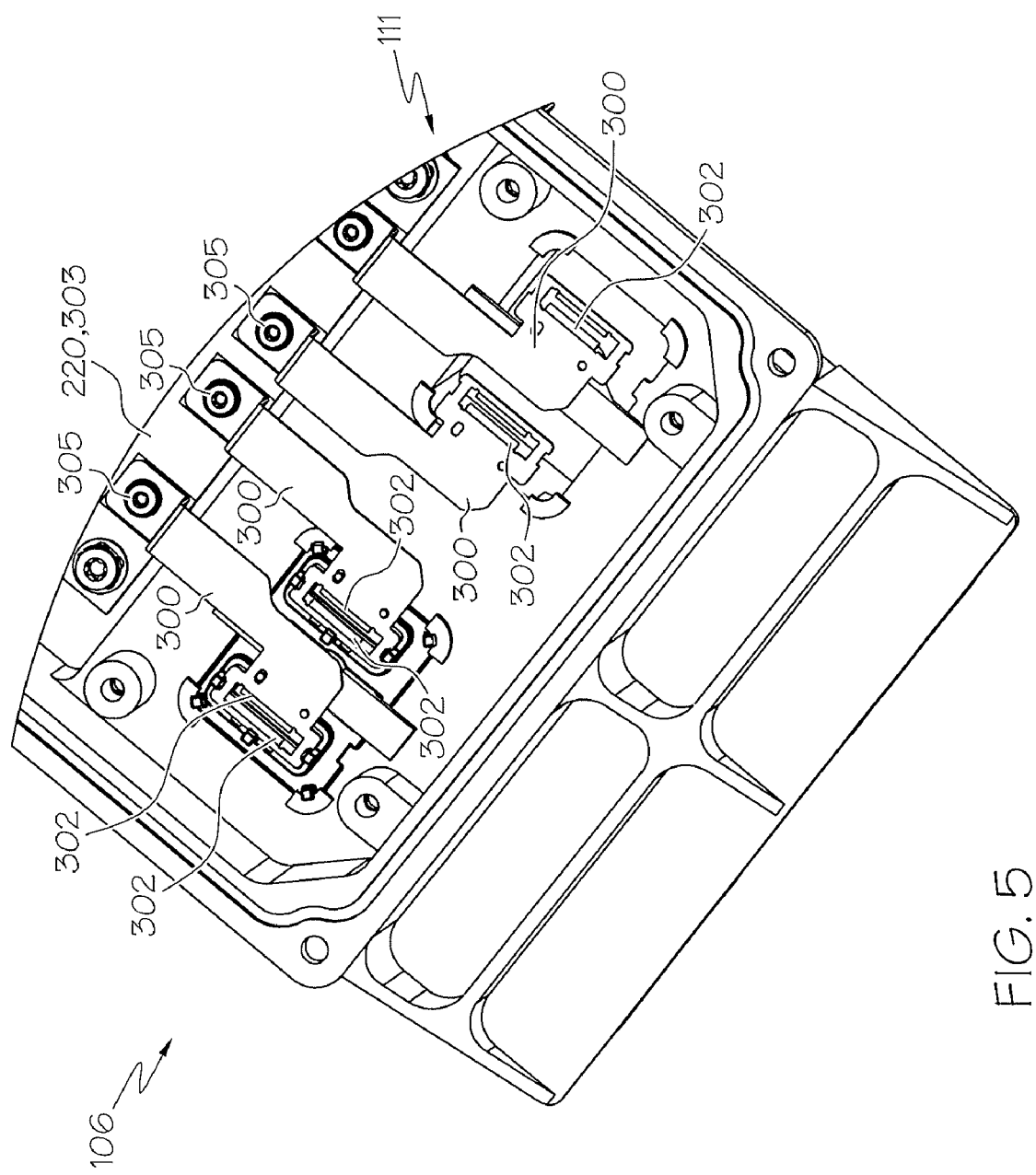
FIG. 5 is another perspective view of a portion of the inverter assembly of FIG. 1, including a portion of the interface assembly of FIGS. 2-4, shown from a bottom view, in accordance with an exemplary embodiment of the present invention.

Specifically, in a preferred embodiment, each of the clips 300 is snapped or pressed against the respective one of the first battery positive busbar 206, the first battery negative busbar 208, the second battery positive busbar 212, or the second battery negative busbar 214 via end pieces 302 that press or snap against the respective one of the first battery positive busbar 206, the first battery negative busbar 208, the second battery positive busbar 212, or the second battery negative busbar 214. In a most preferred embodiment, each of the clips 300 includes two end pieces 302, one on each side of a respective one of the first battery positive busbar 206, the first battery negative busbar 208, the second battery positive busbar 212, or the second battery negative busbar 214. Specifically, each end piece 302 of a particular clip 300 presses against a different side of the respective busbar, for example as depicted in FIG. 5 and described further below in connection therewith. Furthermore, each such end piece 302 comprises a bent tab that provides a spring loaded reaction against the respective busbar, as is also depicted in FIG. 5 and described further below in connection therewith.

Also in a preferred embodiment, the clips 300 are electrically coupled to the first battery positive busbar 206, the first battery negative busbar 208, the second battery positive busbar 212, and the second battery negative busbar 214 via the above-referenced end pieces 302. Specifically, in a preferred embodiment, the first battery positive busbar 206, the first battery negative busbar 208, the second battery positive busbar 212, and the second battery negative busbar 214 make an electrical connection with the clips 300 by engaging with the end pieces 302 (each of which preferably comprises a bent tab, as described above), for example as shown in FIG. 6 and described further below in connection therewith.

Each of the clips 300 is also preferably attached to the circuit board 303. For example, in the depicted embodiment, each of the clips 300 is screwed into the circuit board 303 via a screw device 305. However, this may vary in other embodiments. For example, in certain other embodiments, one or more of the clips 300 may be soldered, glued, or otherwise coupled and/or attached to the circuit board 303 or other communication medium 220.

The clips 300 and end pieces 302 provide for potentially improved coupling between the first battery positive busbar 206, the first battery negative busbar 208, the second battery positive busbar 212, and the second battery negative busbar 214 and the circuit board 303 or other communication medium 220. For example, the spring-loaded clips 300 and end pieces 302 provide a tight, secure, and stable coupling between the first battery positive busbar 206, the first battery negative busbar 208, the second battery positive busbar 212, and the second battery negative busbar 214 and the circuit board 303 or other communication medium 220 while allowing for electrical coupling therebetween. This in turn provides for potentially improved transfer of the first and second measures of electric current between the first battery positive and negative busbars 206, 208 and the second battery positive and negative busbars 212, 214, respectively, and the circuit board 303 or other communication medium 220, while reducing the likelihood of slippage or other issues that could otherwise adversely affect operation of the interface assembly 111 and/or the inverter assembly 106. The configuration of the interface assembly with the spring-loaded clips 300 and end pieces 302 thereby potentially provides improved performance and longevity for the interface assembly 111 and the inverter assembly 106.

Also in a preferred embodiment, the inverter assembly 106 and the interface assembly 111 also include insulators 306, for example as shown in FIG. 3. In a preferred embodiment, the insulators 306 at least partially surround a portion of the first battery positive busbar 206, the first battery negative busbar 208, the second battery positive busbar 212, and the second battery negative busbar 214 to minimize or, preferably, prevent unwanted contacted between the first battery positive busbar 206, the first battery negative busbar 208, the second battery positive busbar 212, and the second battery negative busbar 214. It will be appreciated that in different embodiments various different types and/or numbers of insulators may be utilized.

In addition, an exemplary common mode choke 304 is depicted in FIG. 3. The common mode choke 304 is electrically coupled to the first battery positive busbar 206, the first battery negative busbar 208, the second battery positive busbar 212, and the second battery negative busbar 214. In a preferred embodiment, the common mode choke 304 transfers electric current to, from, and between first battery positive busbar 206, the first battery negative busbar 208, the second battery positive busbar 212, and the second battery negative busbar 214, and also provides EMI filtering. For example, in one preferred embodiment, the common mode choke 304 provides EMI filtering in conjunction with filtering capacitors, such as the X-cap and Y-Cap filtering capacitors 404, 406 depicted in FIG. 4 and described further below in connection therewith. In addition, in one embodiment, the common mode choke 304 extends through the insulators 306 to receive current from the first battery positive busbar 206, the first battery negative busbar 208, the second battery positive busbar 212, and the second battery negative busbar 214. However, this may vary in other embodiments.

FIG. 4 is a perspective view of an underside of a portion of the inverter assembly 106 of FIG. 1, including a portion of the interface assembly 111 of FIGS. 2 and 3, in accordance with an exemplary embodiment of the present invention. As shown in FIG. 4, the inverter assembly 106 of FIG. 1 also preferably includes a plurality of X-capacitors 404 and Y-capacitors 406. As is commonly known in the field, the Y-capacitors 406 are connected to ground, while the X-capacitors 404 are not connected to ground.

The X-capacitors 404 and Y-capacitors 406 are preferably each disposed at least partially within the housing 200, and are each coupled to the circuit board 303 or other communication medium 220. In a most preferred embodiment, the X-capacitors 404 and the Y-capacitors 406 are soldered to the circuit board 303 or other communication medium 220. However, this may vary in other embodiments. In addition, while two exemplary X-capacitors 404 and two Y-capacitors are depicted in FIG. 4, it will be appreciated that the inverter assembly 106 may include a different number of X-capacitors 404 and Y-capacitors 406.

The X-capacitors and Y-capacitors jointly form an EMI filtering interface that is coupled to the circuit board 303 or other communication medium 220. This EMI filtering interface preferably provides EMI filtering in conjunction with the above-referenced common mode choke 304 of FIG. 3, which preferably is disposed inside a common mode choke housing 402 that is similarly housed at least in part within the housing 200, as shown in FIG. 4. However, this also may vary in other embodiments.

FIG. 5 is another perspective view of a portion of the inverter assembly 106 of FIG. 1, including a portion of the interface assembly 111 of FIGS. 2-4, shown from a bottom view, in accordance with an exemplary embodiment of the present invention. As shown in FIG. 5 and discussed above, in a preferred embodiment, each clip 300 comprises two end pieces 302, preferably comprising bent tabs, that are disposed one on each side of each of a corresponding one of the first battery positive busbar 206, the first battery negative busbar 208, the second battery positive busbar 212, or the second battery negative busbar 214. Together, the end pieces 302 press against opposing sides of each of the first battery positive busbar 206, the first battery negative busbar 208, the second battery positive busbar 212, and the second battery negative busbar 214, providing an electrical connection and a spring loaded reaction against each of the first battery positive busbar 206, the first battery negative busbar 208, the second battery positive busbar 212, and the second battery negative busbar 214.

Figure 6:
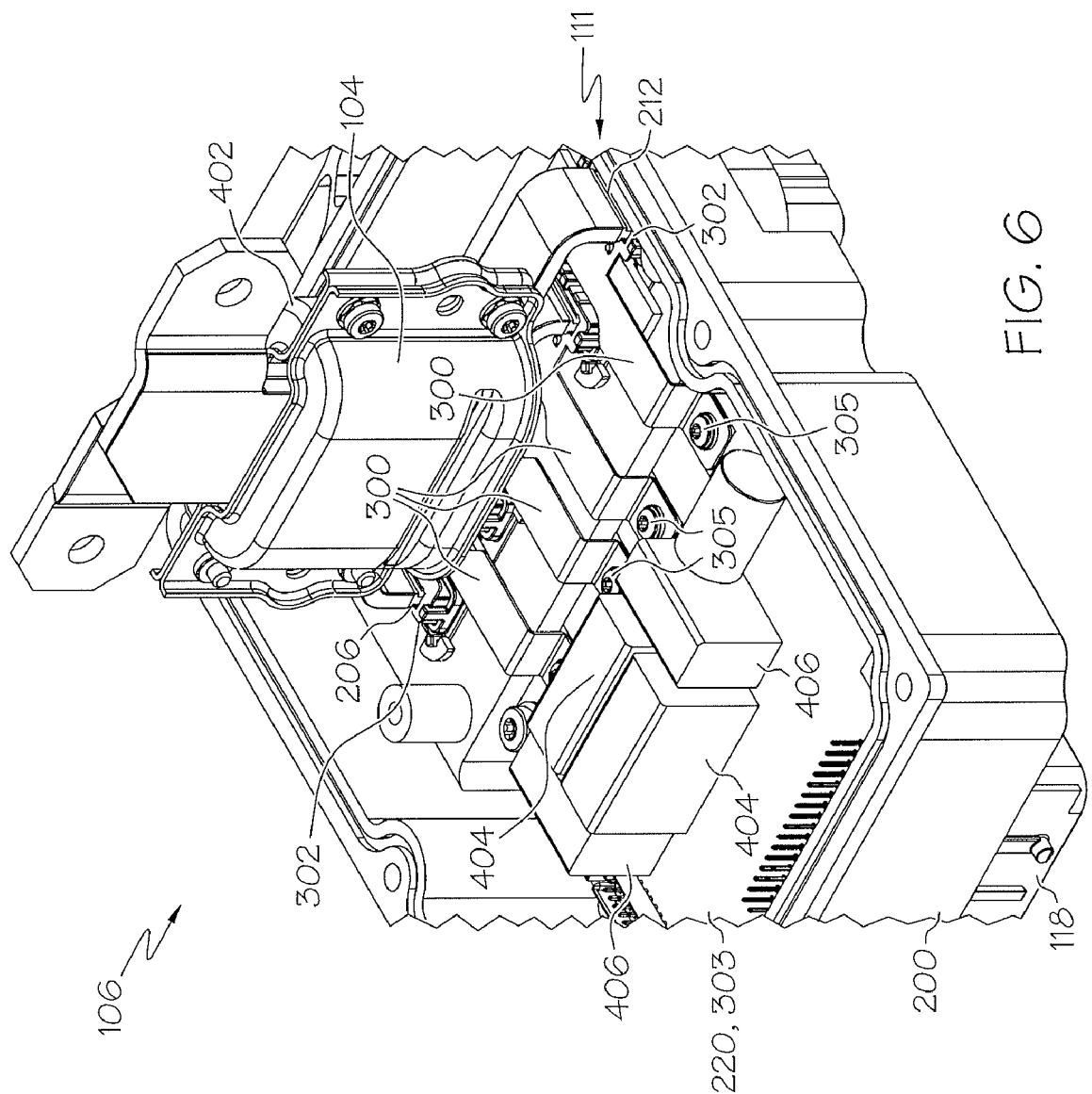
FIG. 6 is another perspective view of a portion of the inverter assembly of FIG. 1, including a portion of the interface assembly of FIGS. 2-5, shown from a top view, in accordance with an exemplary embodiment of the present invention.

FIG. 6 is another perspective view of a portion of the inverter assembly 106 of FIG. 1, including a portion of the interface assembly 111 of FIGS. 2-5, shown from a top view, in accordance with an exemplary embodiment of the present invention. As shown in FIG. 6 and discussed above, the clips 300 are electrically coupled to the first battery positive busbar 206, the first battery negative busbar 208, the second battery positive busbar 212, and the second battery negative busbar 214 via the above-referenced end pieces 302. Specifically, in a preferred embodiment, the first battery positive busbar 206, the first battery negative busbar 208, the second battery positive busbar 212, and the second battery negative busbar 214 make an electrical connection with the clips 300 by engaging with the end pieces 302 (each of which preferably comprises a bent tab, as described above), for example as shown in FIG. 6.

Accordingly, improved interface assemblies for use with inverters of vehicles are provided. The improved interface assemblies provide for potentially improved coupling between the components thereof. Specifically, the improved interface assemblies with the spring-loaded clips and end pieces provide for potentially improved electrical coupling between direct current connectors, communication media, and interfaces of the interface assemblies. As mentioned above, for example, the spring-loaded clips and the end pieces potentially provide a tight, secure, and stable coupling between the various busbars and the circuit board or other communication medium while allowing for electrically coupling therebetween. This in turn provides for potentially improved transfer of the first and second measures of electric current between the busbars and the circuit board or other communication medium, while reducing the likelihood of slippage or other issues that could otherwise adversely affect operation of the interface assembly and/or the inverter assembly. This provides for potentially improved performance and longevity for the interface assemblies and the inverter assemblies associated therewith.

It will be appreciated that the interface assemblies can be implemented in connection with any number of different types of vehicles and in electrically coupling any number of different types of power sources, motors, and/or other devices and systems thereof and/or in connection therewith. It will similarly be appreciated that various features and elements of the disclosed interface assemblies may vary from those depicted in the Figures and/or described herein in certain embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An interface assembly for an inverter of a vehicle, the interface assembly comprising:
    an interface for communicating with one or more vehicle systems outside of the interface assembly;
    a plurality of busbars configured to receive and transport electric current;
    a communication medium electrically coupled between the plurality of busbars and the interface, the communication medium configured to provide information to the interface based at least in part on the electric current transported by the plurality of busbars; and
    a clip assembly electrically coupled between the plurality of busbars and the communication medium.

2. The interface assembly of claim 1, further comprising:
    a housing;
    wherein the interface, the plurality of busbars, the communication medium, and the clip assembly are each housed at least partially within the housing.

3. The interface assembly of claim 1, wherein the clip assembly comprises a plurality of clips, each of the plurality of clips coupling a respective one of the plurality of busbars to the communication medium.

4. The interface assembly of claim 3, wherein each of the plurality of clips has two end pieces engaged with different sides of the respective one of the plurality of busbars.

5. The interface assembly of claim 3, wherein each of the plurality of clips is snapped or pressed against the respective one of the plurality of busbars.

6. The interface assembly of claim 1, further comprising:
    one or more insulators at least partially surrounding a portion of the plurality of busbars.

7. The interface assembly of claim 1, further comprising:
    a common mode choke electrically coupled to the plurality of busbars.

8. The interface assembly of claim 1, further comprising:
    a filtering interface electrically coupled to the communication medium.

9. The interface assembly of claim 3, wherein the communication medium comprises a circuit board.

10. The interface assembly of claim 9, wherein each of the plurality of clips is attached into the circuit board.

11. An interface assembly for an inverter of a vehicle, the interface assembly comprising:
    a housing;
    an interface for communicating with one or more vehicle systems outside of the interface assembly, the interface housed at least partially within the housing;
    a plurality of busbars housed at least partially within the housing and configured to receive and transport electric current;
    a communication medium housed at least partially within the housing, the communication medium electrically coupled between the plurality of busbars and the interface, the communication medium configured to provide information to the interface based at least in part on the electric current transported by the plurality of busbars; and
    a plurality of clips housed at least partially within the housing, each of the plurality of clips electrically coupled between a respective one of the plurality of busbars and the communication medium.

12. The interface assembly of claim 11, wherein each of the plurality of clips has two end pieces engaged with different sides of the respective one of the plurality of busbars.

13. The interface assembly of claim 11, wherein each of the plurality of clips is snapped or pressed against the respective one of the plurality of busbars.

14. The interface assembly of claim 11, wherein the communication medium comprises a circuit board.

15. The interface assembly of claim 14, wherein each of the plurality of clips is attached into the circuit board.

16. The interface assembly of claim 11, further comprising:
    one or more insulators housed at least partially within the housing and at least partially surrounding a portion of each of the plurality of busbars.

17. The interface assembly of claim 11, further comprising:
a plurality of capacitors housed at least partially within the housing and electrically coupled to the communication medium.

18. An interface assembly for an inverter of a vehicle, the interface assembly comprising:
a housing having a wall having a first side and a second side;
an interface for communicating with one or more vehicle systems outside of the interface assembly, the interface disposed adjacent to the first side of the wall;
a plurality of busbars extending through the wall, the plurality of busbars configured to receive and transport electric current;
a circuit board disposed adjacent to the second side of the wall, the circuit board electrically coupled between the plurality of busbars and the interface, the circuit board configured to provide information to the interface based at least in part on the electric current transported by the plurality of busbars; and
a plurality of clips housed at least partially within the housing, each of the plurality of clips having two end pieces engaged with different sides of the respective one of the plurality of busbars, the plurality of clips electrically coupled between the plurality of busbars and the circuit board.

19. The interface assembly of claim 18, wherein each of the plurality of clips is snapped or pressed against the respective one of the plurality of busbars.

20. The interface assembly of claim 18, wherein each of the plurality of clips is attached into the circuit board.

* * * * *